US009204442B2

(12) United States Patent
Chang et al.

(10) Patent No.: US 9,204,442 B2
(45) Date of Patent: Dec. 1, 2015

(54) METHOD, APPARATUS, AND COMMUNICATION SYSTEM FOR CONFIGURING RELAY NODE SUBFRAME

(71) Applicant: HUAWEI TECHNOLOGIES CO., LTD., Shenzhen (CN)

(72) Inventors: Ningjuan Chang, Shenzhen (CN); Jing Liu, Shanghai (CN); Ke Wang, Shanghai (CN); Yan Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 224 days.

(21) Appl. No.: 13/939,341

(22) Filed: Jul. 11, 2013

(65) Prior Publication Data

US 2013/0301517 A1      Nov. 14, 2013

Related U.S. Application Data

(63) Continuation of application No. PCT/CN2012/070140, filed on Jan. 9, 2012.

(30) Foreign Application Priority Data

Jan. 11, 2011  (CN) .......................... 2011 1 0004836

(51) Int. Cl.
*H04L 1/00* (2006.01)
*H04W 72/04* (2009.01)
(Continued)

(52) U.S. Cl.
CPC ........... *H04W 72/0453* (2013.01); *H04B 7/155* (2013.01); *H04L 5/001* (2013.01); *H04L 5/0094* (2013.01)

(58) Field of Classification Search
CPC ....... H04W 84/18; H04W 4/00; H04W 28/00; H04W 28/02; H04W 36/00; H04W 84/12; H04W 88/00
USPC .............. 370/310, 310.5, 313, 315, 328, 329, 370/331, 338, 431, 432, 445, 464, 465
See application file for complete search history.

(56) References Cited

U.S. PATENT DOCUMENTS

2011/0003555 A1    1/2011   Guo
2012/0069795 A1*   3/2012   Chung et al. .................. 370/315

FOREIGN PATENT DOCUMENTS

CN    101827356 A    9/2010
CN    101925188 A    12/2010
(Continued)

OTHER PUBLICATIONS

PCT International Search Report and Written Opinion of the International Searching Authority mailed Apr. 12, 2012 in corresponding International Application No. PCT/CN2012/070140.
(Continued)

*Primary Examiner* — Dady Chery
(74) *Attorney, Agent, or Firm* — Staas & Halsey LLP

(57) ABSTRACT

The present invention discloses a method for configuring a relay node subframe, including: a relay node (RN) sends an RN subframe configuration request for at least one component carrier (CC) to a base station, where the RN subframe configuration request for one or more CCs is used to request for RN subframe configuration for at least one CC; the RN receives the RN subframe configuration information for the at least one CC sent by the base station; and the RN subframe configuration information for the at least one CC is obtained through configuration performed by the base station after the base station receives an RN subframe configuration request for the at least one CC. The present invention also discloses a corresponding apparatus. According to a solution of the present invention, an RN subframe may be configured for a CC when carrier aggregation and RN are deployed in an integrated manner.

14 Claims, 11 Drawing Sheets

(51) Int. Cl.
*H04B 7/155* (2006.01)
*H04L 5/00* (2006.01)

(56) References Cited

FOREIGN PATENT DOCUMENTS

| | | |
|---|---|---|
| EP | 2247011 A1 | 11/2010 |
| WO | 2010/143867 A2 | 12/2010 |

OTHER PUBLICATIONS

Extended European Search Report mailed Oct. 29, 2013 in corresponding European Application No. 12734466.1.
Itri, "Discussion on CA Support for Relay in Rel-10", R2-102866, 3GPP TSG-RAN2#70, May 10-14, 2010, pp. 1-4.
Nokia Siemens Networks (Rapporteur), "TP to 36.912 on Relays and Carrier Aggregation", R2-094083, 3GPP TSG-RAN WG2 Meeting #66bis, Jun. 29-Jul. 3, 2009, pp. 1-6.
Motorola, "Carrier Aggregation Considerations for Relays", R1-092168, 3GPP TSG RAN1#57, May 4-8, 2009, pp. 1-3.
"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)", 3 GPP TS 36.300 V10.2.0, Dec. 2010, pp. 1-200.
International Search Report, dated Apr. 12, 2012, in corresponding International Application No. PCT/CN2012/070140 (6 pp.).

* cited by examiner

METHOD, APPARATUS, AND COMMUNICATION SYSTEM FOR CONFIGURING RELAY NODE SUBFRAME

CROSS-REFERENCE TO RELATED APPLICATIONS

This application is a continuation of International Application No. PCT/CN2012/070140, filed on Jan. 9, 2012, which claims priority to Chinese Patent Application No. 201110004836.5, filed on Jan. 11, 2011, both of which are hereby incorporated by reference in their entireties.

TECHNICAL FIELD

The present invention relates to the field of a wireless technology, and in particular, to a relay node (relay node, RN) subframe configuration method, an apparatus, and a communication system.

BACKGROUND

An RN is introduced during the evolution of a long term evolution (long term evolution, LTE) system. An RN accesses a network through a base station. The base station is called a host base station of the RN. A link between a base station and a user equipment (user equipment, UE) is divided into a relay link between a base station and an RN and an access link between an RN and a UE.

A relay is classified into an in band relay (in band relay) and an out band relay (out band relay) according to whether a relay link and an access link use the same frequency resource. For an in band relay, according to RN capability, if an RN cannot simultaneously implement receiving and transmitting on a relay link and an access link, the RN is a half duplex relay (half duplex relay). During transmission of a half duplex relay, the relay link from the base station to the RN and the access link from the RN to the UE multiplex the same downlink frequency in time division mode, and the access link from the UE to the RN and the relay link from the RN to the base station multiplex the same uplink frequency in time division mode. For a half duplex relay, some subframes used for relay link transmission are allocated in time division multiplexing mode. These subframes are called RN subframes. Subframes used for access link transmission are called access link subframes. For a half duplex relay, RN subframe configuration (RN subframe configuration) is implemented when an RN is accessing the network. RN subframe configuration is performed to configure an RN subframe used for relay link transmission.

In an LTE system network, a carrier aggregation (carrier aggregation, CA) technique is introduced. That is, a base station may simultaneously communicate with a UE on a plurality of carriers. Each carrier performing carrier aggregation is called a component carrier (component carrier, CC). In the prior art, when CA and RN are deployed in an LTE system in an integrated manner, that is, a base station may simultaneously communicate with an RN on a plurality of carriers, the prior art cannot effectively configure an RN subframe in a CA scenario.

SUMMARY

Embodiments of the present invention provide a method for configuring an RN subframe, an apparatus, and a communication system. This may implement RN subframe configuration when CA and RN are deployed in an integrated manner.

An embodiment of the present invention provides a method for configuring an RN subframe, including: a relay node (RN) sends an RN subframe configuration request for one or more component carriers CCs to a base station, where the RN subframe configuration request for one or more CCs is used to request for RN subframe configuration for one or more CCs; the RN receives RN subframe configuration information for the CC sent by the base station; and the RN subframe configuration information for the CC is obtained through configuration performed by the base station after the base station receives the RN subframe configuration request for the CC.

An embodiment of the present invention provides a relay node, including: a sending unit, adapted to send an RN subframe configuration request for one or more component carriers CCs to a base station; a receiving unit, adapted to receive RN subframe configuration information for the CC sent by the base station, where the RN subframe configuration information for the CC is obtained through configuration performed by the base station after the base station receives the RN subframe configuration request for the CC.

An embodiment of the present invention also provides a communication system, where the communication system includes a relay node provided in an embodiment of the present invention.

According to the technical solutions provided in the embodiments of the present invention, an RN sends an RN subframe configuration request for one or more CCs to a base station, and according to the RN subframe configuration request, the base station may configure an RN subframe and then send the RN subframe configuration information for the CC to the RN. This helps achieve RN subframe configuration when CA and RN are deployed in an integrated manner.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
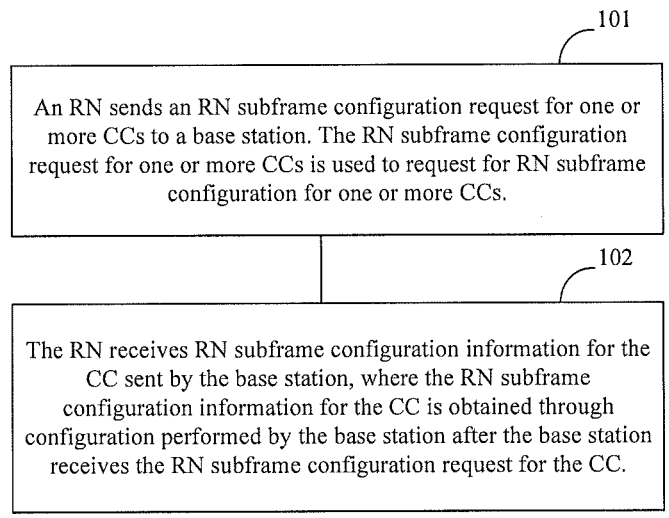
FIG. 1 is a flowchart of a method for configuring an RN subframe according to an embodiment of the present invention.

To make the technical solutions and objectives of the present invention more clear, the following further describes the technical solutions with reference to specific embodiments and the accompanying drawings.

The technical solutions provided in embodiments of the present invention may be applied to various wireless communication networks, such as code division multiple access (code division multiple access, CDMA), time division multiple access (time division multiple access, TDMA), frequency division multiple access (frequency division multiple access, FDMA), orthogonal frequency division multiple access (orthogonal frequency division multiple access, OFDMA), single carrier FDMA (single carrier FDMA, SC-FDMA), and other networks. The terms "network" and "system" are interchangeable. A CDMA network may implement wireless technologies such as universal terrestrial radio access (universal terrestrial radio access, UTRA) and CDMA2000. UTRA may include CDMA (WCDMA) and other CDMA transformation formats. CDMA2000 may cover a temporary standard (Interim Standard, IS)-2000, an IS-95 standard, and an IS-856 standard. A TDMA network may implement wireless technologies, such as global system for mobile communication (global system for mobile communication, GSM). An OFDMA network may implement wireless technologies, such as evolved UTRA (evolved UTRA, E-UTRA), ultra mobile broadband (ultra mobile broadband, UMB), IEEE 802.16, and IEEE 802.20. UTRA and E-UTRA are parts of UMTS. $3^{rd}$ Generation Partnership Project ($3^{rd}$ generation partnership project, 3GPP) and LTE advanced (LTE advanced, LTE-A) are new UMTS versions that use E-UTRA. UTRA, E-UTRA, UMTS, LTE, LTE-A, and GSM are described in a 3GPP standard organizational document. CDMA2000 and UMB are described in A 3GPP2 standard organizational document. Technologies described in embodiments of the present invention may also be applied to the wireless networks and wireless technologies.

In the embodiments of the present invention, a wireless network may include a base station and other network entities. The base station may be a site communicating with a UE, an evolved Node B (evolved Node B, eNB), a Node B, or an access point (access point), and so on. Each base station may provide communication coverage for a specific geographic area. In 3GPP, the term "cell (cell)" may be a coverage area of a base station, and/or a coverage area served by a base station subsystem, depending on the context where the term is used.

A base station may provide a communication coverage for a macro cell, a pico cell (pico cell), a femto cell (femto cell), and/or other types of cells. A macro cell may cover a relatively large geographic area (such as an area with a radius of several kilometers) and allow unrestricted access of a UE subscribed to a service. A pico cell may cover a relatively small geographic area and allow unrestricted access of a UE subscribed to a service. A femto cell covers a relatively small geographic area (such as, home) and allows restricted access of a UE associated with the femto cell (such as a UE in a closed subscriber group (closed subscriber group, CSG)). A base station that provides a service for a macro cell is called a macro base station, and a base station that provides a service for a pico cell is called a pico base station, and a base station that provides a service for a femto cell is called a femto base station or home base station. A base station may support one or more (such as 3) cells.

In the embodiment of the prevent invention, an eNB is used as an example for description, but not limited to the eNB.

In the embodiment of the prevent invention, an RN may receive data transmission and/or other information sent by an uplink node (such as a base station or other RNs), and send data transmission and/or other information to a downlink node (such as a UE or other RNs). An RN may also be a UE that provides relay transmission for other UEs. An RN may communicate with a macro base station and a UE to facilitate communication between the base station and the UE. An RN is also called a relay station (relay station, RS), or relay (relay), and so on.

In the embodiment of the present invention, a wireless network may be a network covering different types of base stations, such as a macro base station, a pico base station, a femto base station, and an RN. Different types of base stations have different transmit power, coverage ranges, and have different degrees of interference on a wireless network. For example, a macro base station may have high transmit power (such as 20 W). However, a pico base station, a femto base station, and an RN may have lower transmit power (such as 1 W).

In the embodiment of the present invention, a UE may be deployed throughout a wireless network. Each UE may be either static or moving. A UE may be called a terminal (terminal), a mobile station (mobile station, MS), a subscriber unit (subscriber unit), a station (station), and so on. A UE may be a cellular phone (cellular phone), a personal digital assistant (personal digital assistant, PDA), a wireless modem (modem), a wireless communications device, a handheld device (handheld), a laptop computer (laptop computer), a cordless phone (cordless phone), a wireless local loop (wireless local loop, WLL) station, and so on. A UE may communicate with a macro base station, a pico base station, a femto base station, an RN, and so on.

In the embodiment of the present invention, each carrier that provides a service for an RN or a UE may be a serving cell for the RN or the UE. Each serving cell of the RN or the UE corresponds to a cell index (cell index). The cell that provides network connection for the RN or the UE may be a primary cell (primary cell, Pcell) of the RN or the UE. An uplink carrier and a downlink carrier corresponding to the PCell are called an uplink PCC and a downlink PCC of the RN or the UE, respectively. Except for the PCell, other cells that provide a transmission resource for the RN or the UE are called secondary cells (secondary cell, Scell) of the RN. An uplink carrier and a downlink carrier corresponding to the Scell are called an uplink SCC and a downlink SCC, respectively.

As shown in FIG. 1, an embodiment of the present invention provides a method for configuring an RN subframe. The method includes:

Step 101: An RN sends an RN subframe configuration request for one or more CCs (RN subframe configuration request for one or more CCs) to a base station. The RN subframe configuration request for one or more CCs is used to request for RN subframe configuration for one or more CCs.

Step 102: The RN receives RN subframe configuration information for the CC (RN subframe configuration information for the CC) sent by the base station. The RN subframe configuration information for the CC is obtained through configuration performed by the base station after the base station receives the RN subframe configuration request for the CC.

In the embodiment of the present invention, the one or more CCs may be a secondary CC, that is, SCell. Alternatively, the more CCs may also include a secondary CC and a primary CC, that is, PCell and SCell.

According to the method provided in the embodiment, an RN may request for RN subframe configuration for one or more CCs. In this way, the RN may obtain RN subframe configuration information for the CC configured by a base station. This enables relay link resource configuration when CA and RN are deployed in an integrated manner, thereby solving the problem that the prior art does not support RN subframe configuration when link deployment is performed on CA and RN.

Figure 2:
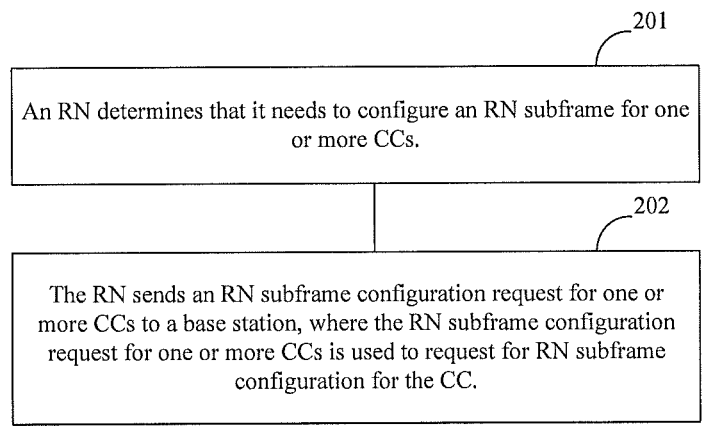
FIG. 2 is a flowchart of another method for configuring an RN subframe according to an embodiment of the present invention.

As shown in FIG. 2, an embodiment of the present invention provides another method for configuring an RN subframe. The method includes:

Step 201: An RN determines that it needs to configure an RN subframe for one or more CCs.

Step 202: The RN sends an RN subframe configuration request for one or more CCs to a base station. The RN subframe configuration request for one or more CCs is used to request for RN subframe configuration for the CC.

In the embodiment, the RN may further receive RN subframe configuration information for the CC sent by the base station.

In the embodiment, the RN may contain the RN subframe configuration request for the one or more CCs in an RRC connection reconfiguration complete (RRC connection reconfiguration complete) message, for sending the RN subframe configuration request for the one or more CCs to the base station. Alternatively, the RN may contain the RN subframe configuration request for the one or more CCs in an RRC message, for sending the RN subframe configuration request for the one or more CCs to the base station. Alternatively, the RN may contain the RN subframe configuration request for the one or more CCs in an RRC connection reestablishment complete (RRC connection reestablishment complete) message, for sending the RN subframe configuration request for the one or more CCs to the base station.

The RRC connection reconfiguration complete message or the RRC connection reestablishment complete message indicates the RN subframe configuration request for the one or more CC in a bitmap mode of n bits. The n bits correspond to RN subframe configuration requests for n CCs, and n is greater than or equal to 1. Alternatively, the RRC connection reconfiguration complete message or the RRC connection reestablishment complete message indicates the RN subframe configuration request for the one or more CCs in subframe request list mode.

In the embodiment, the base station may contain the RN subframe configuration information for the CC in an RN reconfiguration (RN reconfiguration) message, for sending the RN subframe configuration information for the CC to the RN. Alternatively, the base station may also contain the RN subframe configuration information for the CC in an RRC connection reconfiguration message, for sending the RN subframe configuration information for the CC to the RN.

According to the method provided in the embodiment of the present invention, an RN may determine whether it needs to configure an RN subframe for one or more CCs. If the RN determines that it needs to configure an RN subframe for one or more CCs, the RN sends the RN subframe configuration request for one or more CCs to a base station, for triggering the base station to configure the RN subframe for the CC. This enables relay link resource configuration when CA and RN are deployed in an integrated manner, thereby solving the problem that the prior art does not support RN subframe configuration when link deployment is performed on CA and RN.

Figure 3:
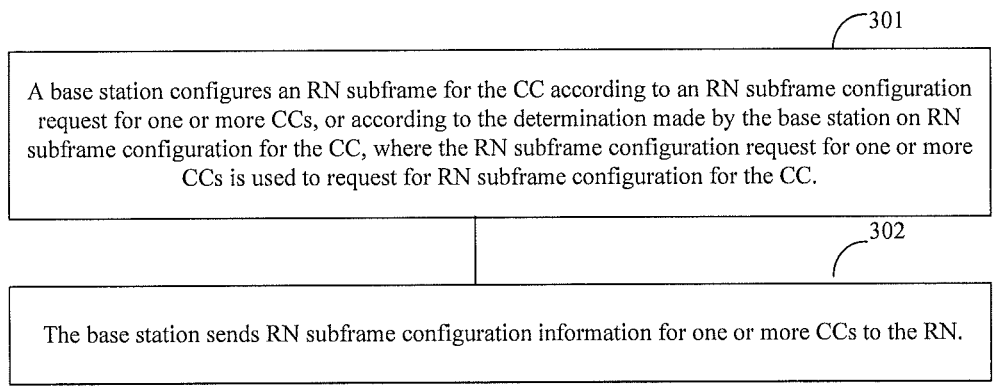
FIG. 3 is a flowchart of still another method for configuring an RN subframe according to an embodiment of the present invention.

As shown in FIG. 3, an embodiment of the present invention provides still another method for configuring an RN subframe. The method includes:

Step 301: A base station configures an RN subframe for a CC according to an RN subframe configuration request for one or more CCs, or according to the determination made by the base station on RN subframe configuration for the CC. The RN subframe configuration request for one or more CCs is used to request for RN subframe configuration for the CC.

Step 302: The base station sends RN subframe configuration information for one or more CCs to the RN.

In the embodiment, the RN subframe configuration request for the CC is sent by the RN.

In the embodiment, the base station may contain the RN subframe configuration information for the CC in an RN reconfiguration message, for sending the RN subframe configuration information for the CC to the RN. Alternatively, the base station may contain the RN subframe configuration information for the CC in an RRC connection reconfiguration message, for sending the RN subframe configuration information for the CC to the RN.

If the RN reconfiguration message includes the RN subframe configuration information for the CC: the RN reconfiguration message includes an RN subframe configuration list. The RN subframe configuration list is used to indicate RN subframe configuration information for a primary CC and/or RN subframe configuration information for a secondary CC; or the RN reconfiguration message includes an RN subframe configuration list for a secondary CC. The RN subframe configuration list for the secondary CC is used to indicate the RN subframe configuration information for the secondary CC; or the RN reconfiguration message includes an RN subframe configuration CC list and RN subframe configuration information. The RN subframe configuration CC list is used to indicate a CC requiring RN subframe configuration. The RN subframe configuration information for the CC indicated in the RN subframe configuration CC list is the RN subframe configuration information.

If the RRC connection reconfiguration message includes the RN subframe configuration information for the CC: the RRC connection reconfiguration message includes an RN subframe configuration list. The RN subframe configuration list is used to indicate the RN subframe configuration information for the CC.

In the embodiment, the RN reconfiguration message or the RRC connection reconfiguration message also includes a relay link channel configuration information list, which is used to indicate the relay link channel configuration information for the CC.

In the embodiment, the RN may contain the RN subframe configuration request for the CC in an RRC connection reconfiguration complete (RRC connection reconfiguration complete) message, for sending the RN subframe configuration request for the CC to the base station. Alternatively, the RN may contain the RN subframe configuration request for the CC in an RRC message, for sending the RN subframe configuration request for the CC to the base station. Alternatively, the RN may contain the RN subframe configuration request for the CC in an RRC connection reestablishment complete message, for sending the RN subframe configuration request for the CC to the base station.

According to the method provided in the embodiment, the base station may configure an RN subframe for the CC according to the RN subframe configuration request for one or more CCs or according to the base station itself. In this way, the base station may obtain the RN subframe configuration information for one or more CCs and send the information to the RN. This enables relay link resource configuration when CA and RN are deployed in an integrated manner, thereby solving the problem that the prior art does not support RN subframe configuration when link deployment is performed on CA and RN.

Figure 4:
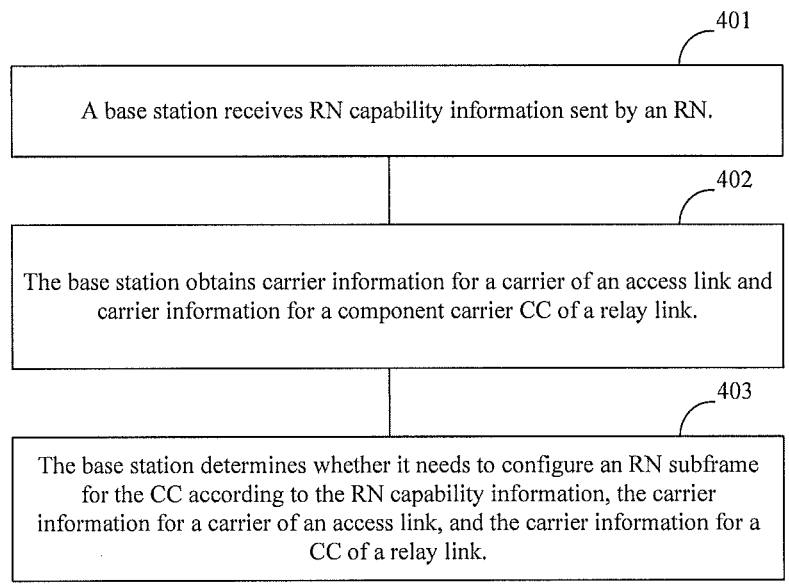
FIG. 4 is a flowchart of yet another method for configuring an RN subframe according to an embodiment of the present invention.

As shown in FIG. 4, an embodiment of the present invention provides still another method for configuring an RN subframe. The method includes:

Step 401: A base station receives RN capability information sent by an RN.

Step 402: The base station obtains carrier information for a carrier of an access link and carrier information for a component carrier CC of a relay link.

Step 403: The base station determines whether it needs to configure an RN subframe for the CC according to the RN capability information, the carrier information for a carrier of an access link, and the carrier information for a CC of a relay link.

In the embodiment, the CC includes a secondary component carrier or the CC includes a secondary component carrier and a primary component carrier.

In the embodiment, the RN capability information may be an RN antenna isolation degree. The embodiment may also include: the base station configures an RN subframe for the CC and sends the RN subframe configuration information for the CC to the RN. In the embodiment, the base station may contain the RN subframe configuration information for the CC in an RN reconfiguration message, for sending the RN subframe configuration information for the CC to the RN. Alternatively, the base station may contain the RN subframe configuration information for the CC in an RRC connection reconfiguration message, for sending the RN subframe configuration information for the CC to the RN.

The RN reconfiguration message includes an RN subframe configuration list. The RN subframe configuration list is used to indicate RN subframe configuration information for a primary CC and/or RN subframe configuration information for a secondary CC. Alternatively, the RN reconfiguration message includes an RN subframe configuration list for a secondary CC. The RN subframe configuration list for the secondary CC is used to indicate the RN subframe configuration information for the secondary CC. Alternatively, the RN reconfiguration message includes an RN subframe configuration CC list and RN subframe configuration information. The RN subframe configuration CC list is used to indicate a CC requiring RN subframe configuration. The RN subframe configuration information for the CC indicated in the RN subframe configuration CC list is the RN subframe configuration information.

If the RRC connection reconfiguration message includes the RN subframe configuration information for the CC: the RRC connection reconfiguration message includes an RN subframe configuration list. The RN subframe configuration list is used to indicate the RN subframe configuration information for the CC.

According to the method provided in the embodiment of the present invention, a base station may determine whether it needs to configure an RN subframe for a CC according to the RN capability information and carrier information for a CC. In this condition, the base station may actively trigger configuration of a relay link resource when CA and RN are deployed in an integrated manner, without receiving a request from an RN. This solves the problem that the prior art does not support RN subframe configuration when link deployment is performed on CA and RN.

Figure 5A:
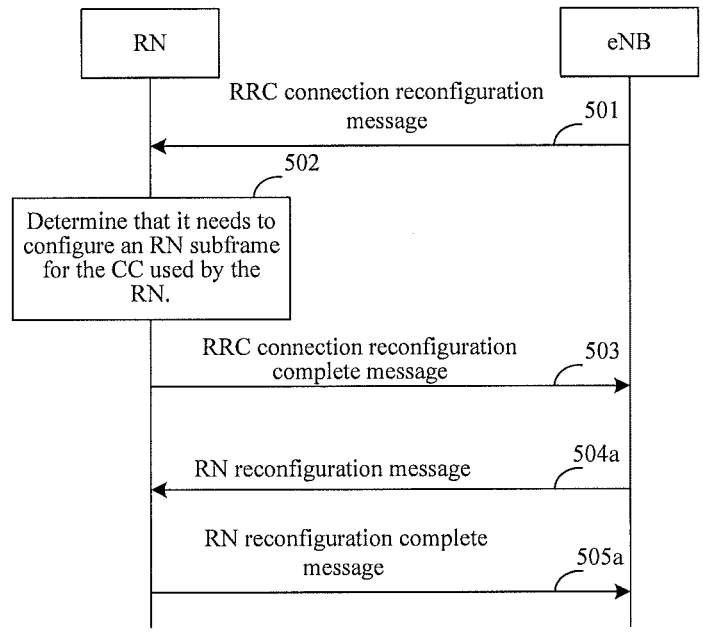
FIG. 5A and FIG. 5B are signaling flowcharts of a method for configuring an RN subframe according to an embodiment of the present invention.
Figure 5B:
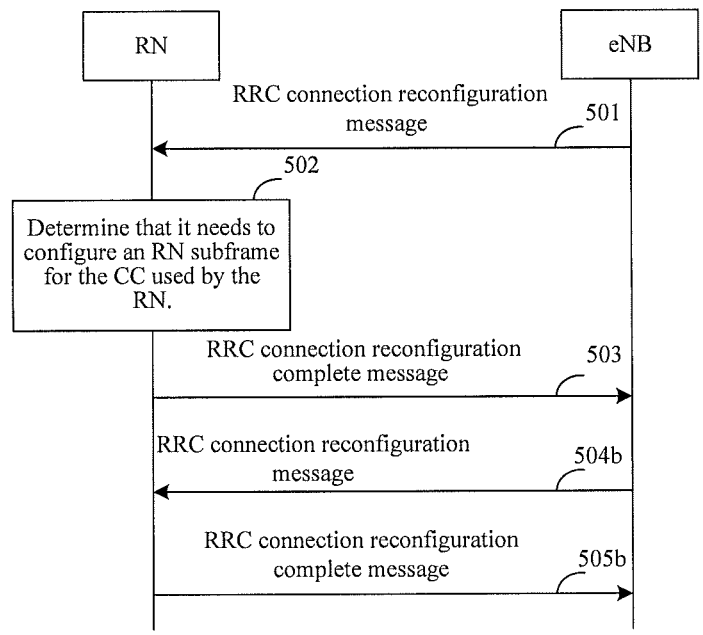

As shown in FIG. 5A and FIG. 5B, an embodiment of the present invention provides a signaling flowchart of a method for configuring an RN subframe. The method includes:

Step 501: An RN receives a radio resource control (radio resource control, RRC) connection reconfiguration (RRC connection reconfiguration) message sent by an eNB.

The eNB may send SCell configuration information to the RN using an RRC connection reconfiguration message, for adding SCell configuration of a relay link, deleting SCell configuration of a relay link, or adding and deleting SCell configuration of a relay link. The SCell configuration information may contain an SCell adding list, an SCell deleting list, or an SCell adding and deleting list, and so on.

For example, a relay link from an eNB to an RN originally uses a CC1 in the downlink direction. The eNB may add a CC2 to the downlink direction of the relay link using Scell configuration information that includes an SCell adding list. In this case, the CC1 and CC2 are used in the downlink direction of the relay link, and the CC2 is a newly added CC. Alternatively, a relay link originally uses CC1 and CC2 in the downlink direction. The eNB may delete CC1 used in the downlink direction of the relay link using Scell configuration information that includes an SCell deleting list. In this case, only CC2 is used for the relay link and CC2 is the remaining CC after deletion.

Step 502: The RN determines whether it needs to configure an RN subframe for the CC used by the RN according to the carrier information for a CC of a relay link, the carrier information for a carrier of an access link, and the RN capability information.

After the Scell of the RN receives an RRC connection reconfiguration message that includes SCell configuration information, the RN configures the SCell. The RN may determine whether it needs to configure an RN subframe for the CC of a relay link according to the carrier information for a CC of a relay link, the carrier information for a carrier of an access link, and the RN capability information.

The RN capability information may be an RN antenna isolation degree and/or an RN interference elimination capability. For example, if a CC is simultaneously used on a relay link and an access link, the RN antenna isolation degree is low, and full-duplex transmission cannot be implemented on the CC, it may be determined that RN subframe configuration needs to be performed on the CC. If a CC is simultaneously used on a relay link and an access link, the RN antenna isolation degree is high enough, and full-duplex transmission may be implemented on the CC; or if the CC is only used on a relay link or an access link, it may be determined that RN subframe configuration does not need to be performed on the CC. Alternatively, if a CC is simultaneously used on a relay link and an access link and the RN antenna isolation degree is low, but the RN subframe has the capability of eliminating interference and may eliminate interference caused by a low RN antenna isolation degree, the RN may also determine that RN subframe configuration does not need to be performed on the CC.

Step 503: The RN sends an RRC connection reconfiguration complete (RRC connection reconfiguration complete) message to the eNB.

If the RN determines that it needs to configure an RN subframe for a CC of a relay link, the RN may contain an RN subframe configuration request for one or more CCs in the RRC connection reconfiguration complete message. The RN subframe configuration request is used to request for RN subframe configuration for one or more CCs. The one or more CCs may be a secondary CC. Alternatively, when there are more CCs, these CCs may also include a secondary CC and a primary CC.

In the embodiment, CCs involved in the RN subframe configuration request for CCs contained in the RRC connection reconfiguration complete message may refer to all CCs used on a relay link of an RN, and also may refer to changed CCs on a relay link. All CCs used on a relay link refer to all CCs on the relay link after the RRC connection reconfiguration process. The changed CCs on the relay link include newly added CCs on the relay link, remaining CCs after deletion of original CCs on the relay link, or CCs on the relay link that are affected by the adding and/or deleting of CCs on an access link. The CCs on a relay link that are affected by the adding and/or deleting of CCs on an access link refer to the CCs on a relay link that are the same as the added and/or deleted CCs on an access link. For example, CC1 and CC2 are on a relay link. If an original CC on the relay link is CC1, and CC2 is now added on the access link, CC2 used on the relay link is affected. Therefore, an RN subframe for CC2 needs to be configured. If the original CCs on the access link are CC1 and CC2, and now CC1 is deleted from the access link, CC1 used on the relay link is also affected. Therefore, an RN subframe for CC1 needs to be configured.

Figure 6:
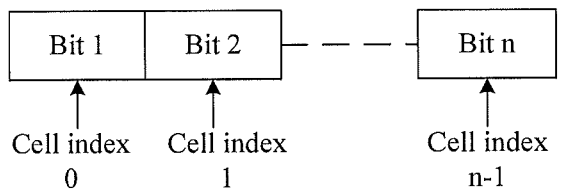
FIG. 6 is a schematic diagram for indicating an RN subframe configuration request in bitmap mode according to an embodiment of the present invention.

In an RRC connection reconfiguration complete message, the RN subframe configuration request for a CC may be indicated in bitmap mode, for instructing whether it needs to configure an RN subframe for the CC. Bit 0 or 1 in a bitmap indicates whether it needs to configure an RN subframe for the CC. For example, if the current number of CCs for a relay link is n, n bits are used to indicate an RN subframe configuration request for each CC in the sequence of a cell index (cell index). As shown in FIG. 6, a schematic diagram is used for indicating an RN subframe configuration request in bitmap mode. Among n bits, bit 1 indicates the subframe configuration request for a CC corresponding to a cell whose cell index is 0. Bit 2 indicates the subframe configuration request for a CC corresponding to a cell whose cell index is 1. By analogy, bit n indicates the subframe configuration request for a CC corresponding to a cell whose cell index is n−1. For example, if a relay link originally uses CC1 and CC2, and an eNB adds CC3 on the relay link using SCell configuration information, an RN subframe for CC3 needs to be configured. In this case, the RN subframe configuration request for the CC used by the RN may be indicated using 001, where 0 indicates that the RN subframe for the CC corresponding to the bit does not need to be configured, and 1 indicates that the RN subframe for the CC corresponding to the bit needs to be configured. When a CC used by the RN is changed, such as deleted, or there is a CC on a relay link affected by the adding and/or deleting of a CC on an access link, the RN subframe configuration request for a CC may also be indicated in bitmap mode in an RRC connection reconfiguration complete message, for instructing whether it needs to configure an RN subframe for the specified CC.

Alternatively, a subframe request list (subframe request list) in an RRC connection reconfiguration complete message may also be used to indicate the RN subframe configuration request for a CC. The subframe request list carries the cell index (cell index) for the CC that requires RN subframe configuration. For example,

```
rn-subframeconfigreqList ::=    SEQUENCE (SIZE (1..maxcell)) OF
rn-SubframeConfigReq
rn-SubframeConfigReq ::=   SEQUENCE {
    cell-index                          ServCellIndex,
}
```

For example, if a relay link originally uses CC1 and CC2, and an eNB adds CC3 on the relay link using SCell configuration information, an RN subframe for CC3 needs to be configured. In this case, a cell index for CC3 may be carried in the subframe request list to indicate that the RN requests the eNB to configure an RN subframe for CC3.

Alternatively, a cell index for a CC of an RN relay link may also be carried in a subframe request list to indicate whether RN subframe configuration is required for a CC corresponding to a cell index. For example, the format of a subframe request list may be as follows:

```
rn-subframeconfigreqList ::=    SEQUENCE (SIZE (1..maxcell)) OF
rn-SubframeConfigReq
rn-SubframeConfigReq ::=   SEQUENCE {
    cell-index                          ServCellIndex,
    rn-SubframeConfigReq-r10            ENUMERATED {required,
    notRequired}
}
```

For example, if a relay link originally uses CC1 and CC2, and an eNB adds CC3 on the relay link using SCell configuration information, an RN subframe for CC3 needs to be configured. The cell indexes for CC1, CC2, and CC3 may be indicated in a subframe request list. In this case, the fields corresponding to CC1 and CC2 may be set to not Required, which indicates that an RN subframe for CC1 and CC2 does not need to be configured. The field corresponding to CC3 may be set to required, which indicates that the RN subframe for the CC3 needs to be configured. When a CC on an RN relay link is deleted, or there is a CC on a relay link affected by the adding and/or deleting of a CC on an access link, the RN subframe configuration request for a CC may also be indicated in a subframe request list.

According to the method provided in the embodiment, after an RN receives an RRC connection reconfiguration message that includes SCell configuration information sent by the eNB, the RN may contain an RN subframe configuration request for a CC in an RRC connection reconfiguration complete message and send the request to the eNB. In this case, the eNB may configure an RN subframe according to the RN subframe configuration request for the CC.

As shown in FIG. 5A, the embodiment may further include:

Step 504a: An RN receives an RN reconfiguration message sent by an eNB.

The RN reconfiguration message includes the RN subframe configuration information that is obtained through configuration performed by an eNB for a CC. After the eNB receives an RN subframe configuration request for a CC sent by the RN, the eNB may obtain RN subframe configuration information for the CC according to operation, administration and management (operation, administration and management, OAM) configuration, the resource required for a relay link of the RN, and the impact on configuration of a relay link for other RNs under the eNB.

The RN subframe configuration information for a CC may be RN subframe configuration information for a secondary CC carried in an information element (information element, IE) "RN subframe configuration list (m subframe configuration list)". The RN subframe configuration list also includes RN subframe configuration information for a primary CC. Alternatively, the RN subframe configuration list (such as IE "SCell un subframe configuration list") for a secondary CC may be carried in an RN reconfiguration message. The RN subframe configuration list for the secondary CC includes the subframe configuration information for a relay link for the secondary CC. Alternatively, the RN reconfiguration message includes an RN subframe configuration CC list and RN subframe configuration information. The RN subframe configuration CC list is used to indicate a CC requiring RN subframe configuration. The RN subframe configuration information for the CC indicated in the RN subframe configuration CC list is the RN subframe configuration information. The format of the RN subframe configuration list for the secondary CC may be the same as that of the RN subframe configuration list.

Step 505a: The RN sends an RN reconfiguration complete (RN reconfiguration complete) message to the eNB.

After the RN receives an RN reconfiguration message, the RN obtains the RN subframe configuration information for a CC, and then sends an RN reconfiguration complete message to the eNB.

Alternatively, as shown in FIG. 5B, the embodiment may further include:

Step 504b: The RN receives an RRC connection reconfiguration message sent by the eNB.

The RRC connection reconfiguration message includes the RN subframe configuration information that is configured by the eNB for a CC.

The eNB may obtain the RN subframe configuration information for a CC according to the OAM configuration, the resource required for a relay link of the RN, and the impact on configuration of a relay link for other RNs under the eNB.

In an RRC connection reconfiguration message, the RN subframe configuration information for a CC may be carried in the IE "RN subframe configuration (RN subframe configuration)". For example, the RN subframe configuration information may be carried using the IE "RN subframe configuration" in the SCell adding configuration (such as IE "SCellToAddMod-r10") in the RRC connection reconfiguration message. The IE "RN subframe configuration" may also be carried in other IEs of the RRC connection reconfiguration message.

After the eNB configures an RN subframe, the eNB may initiate a new RRC connection reconfiguration procedure by sending an RRC connection reconfiguration message to the RN.

Step 505b: The RN sends an RRC connection reconfiguration complete message to the eNB.

After the RN receives an RRC connection reconfiguration message, the RN obtains the RN subframe configuration information for a CC, and then sends an RRC connection reconfiguration complete message to the eNB.

According to the method provided in the embodiment, when CA and RN are deployed in an integrated manner, an RN may send an RN subframe configuration request for one or more CCs to an eNB through an RRC connection reconfiguration procedure. After the eNB configures an RN subframe, the eNB sends the RN subframe configuration information for a CC to the RN through an RN reconfiguration procedure or an RRC connection reconfiguration procedure. This solves the problem of triggering, configuring, and sending RN subframe configuration information for a CC during RN subframe configuration for a CC. In this condition, a resource for a relay link for the RN may be configured in a CA scenario. This solves the problem that the prior art does not support RN subframe configuration when link deployment is performed on CA and RN.

Figure 7A:
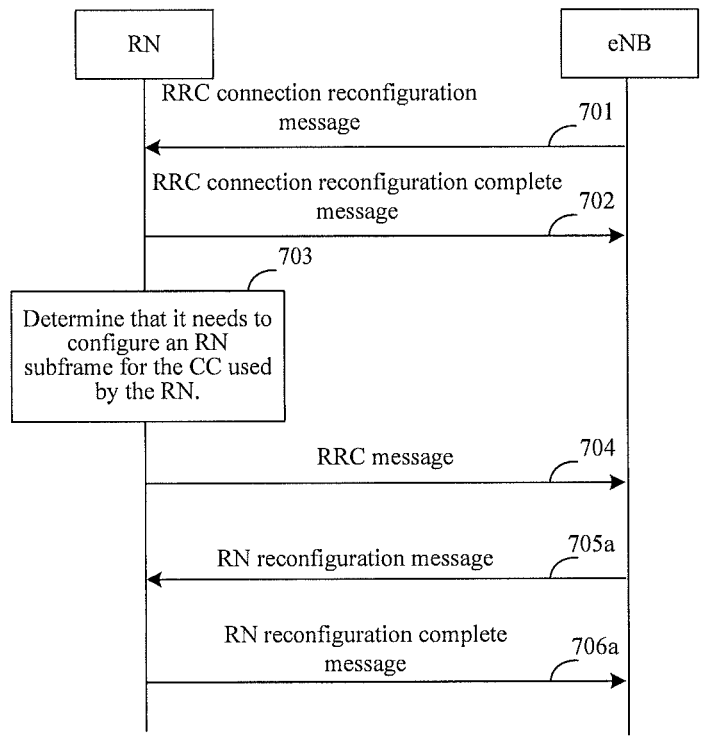
FIG. 7A and FIG. 7B are signaling flowcharts of another method for configuring an RN subframe according to an embodiment of the present invention.
Figure 7B:
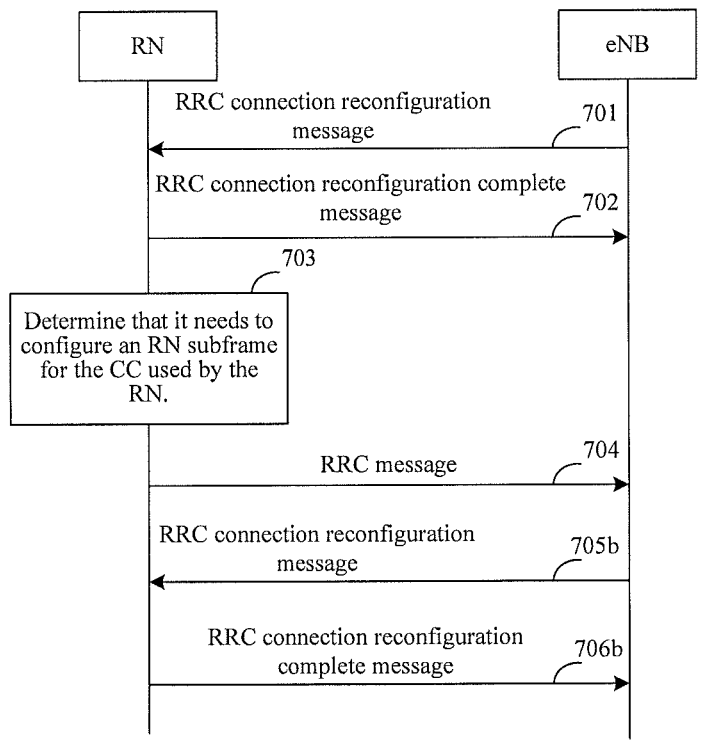

As shown in FIG. 7A and FIG. 7B, an embodiment of the present invention provides a signaling flowchart of another method for configuring an RN subframe. The method includes:

Step 701: Refer to step 501 in the embodiment shown in FIG. 5A or FIG. 5B.

Step 702: An RN sends an RRC connection reconfiguration complete message to an eNB.

Step 703: Refer to step 502 in the embodiment shown in FIG. 5A or FIG. 5B.

Step 704: The RN sends an RRC message to the eNB. The RRC message includes an RN subframe configuration request for a CC.

The RRC message may be a message that is different from an existing RRC message in the prior art or a newly-defined RRC message.

CCs involved in RN subframe configuration requests for CCs included in the RRC message may refer to all CCs used by the RN, and also may refer to changed CCs. The changed CCs include newly added CCs, remaining CCs after deletion, or CCs on a relay link affected by the adding and/or deleting of CCs on an access link. The RN subframe configuration request for a CC used by the RN may be in bitmap mode or in subframe request list mode. For details, refer to step 503 in the embodiment shown in FIG. 5A or FIG. 5B.

Different from the embodiment shown in FIG. 5A or FIG. 5B, in the embodiment, the RRC connection reconfiguration complete message that the RN sends to the eNB does not include an RN subframe configuration request for a CC. Instead, the RN uses an RRC message to send the RN subframe configuration request for the CC to the eNB. This ensures that the eNB may configure an RN subframe.

In the embodiment, after the RN receives an RRC connection reconfiguration message that includes SCell configuration information sent by the eNB, the RN includes an RN subframe configuration request for a CC in a newly-defined RRC message and sends the request to the eNB. In this case, the eNB may configure an RN subframe according to the RN subframe configuration request for the CC.

As shown in FIG. 7A, the method in the embodiment may further include steps 705a and 706a.

For details about steps 705a and 706a, refer to steps 504a and 505a in the embodiment shown in FIG. 5A.

Alternatively, as shown in FIG. 7B, the embodiment may further include steps 705b and 706b.

For details about steps 705b and 706b, refer to steps 504b and 505b in the embodiment shown in FIG. 5B.

According to the method provided in the embodiment, an RN may send an RN subframe configuration request for a CC to an eNB using a newly-defined RRC message through an RRC connection reconfiguration procedure. After the eNB configures an RN subframe, the eNB sends the RN subframe configuration information for a CC to the RN through an RN reconfiguration procedure or an RRC connection reconfiguration procedure. This solves the problem of triggering, configuring, and sending RN subframe configuration information for a CC during RN subframe configuration for a CC. In this condition, a resource for a relay link for the RN may be configured in a CA scenario. This solves the problem that the prior art does not support RN subframe configuration when link deployment is performed on CA and RN.

Figure 8A:
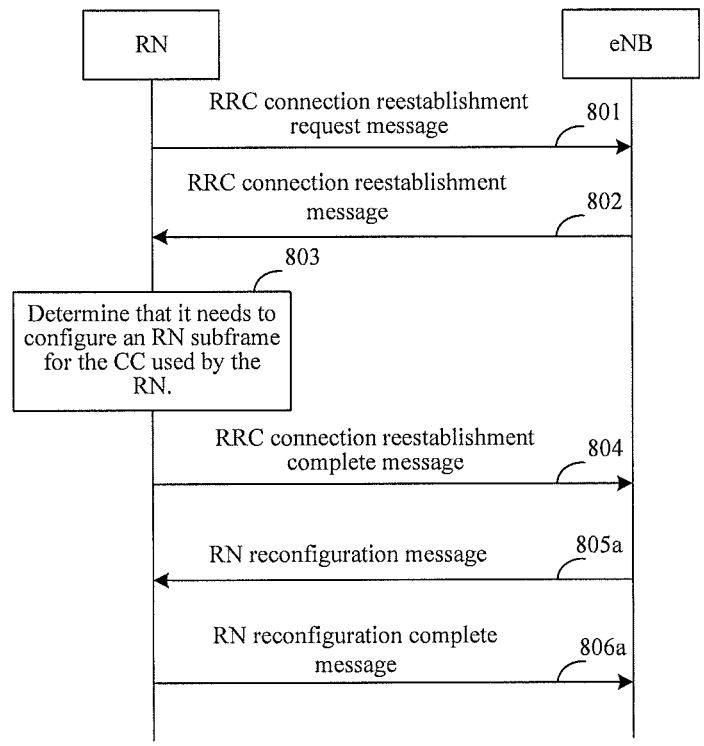
FIG. 8A and FIG. 8B are signaling flowcharts of still another method for configuring an RN subframe according to an embodiment of the present invention.
Figure 8B:
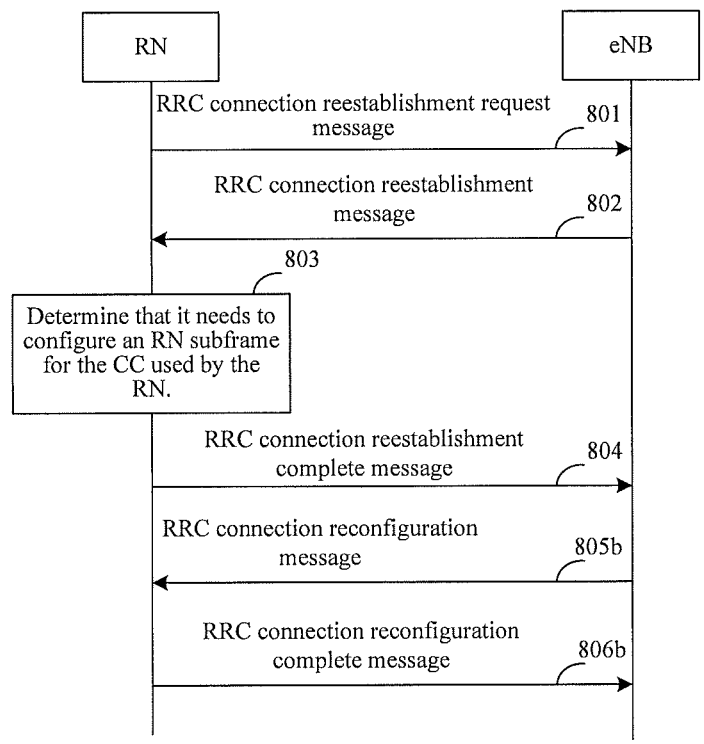

As shown in FIG. 8A or FIG. 8B, an embodiment of the present invention provides a signaling flowchart of a method for configuring an RN subframe. In the embodiment, an RN sends an RN subframe configuration request for a CC used by the RN to an eNB. As shown in FIG. 8A or FIG. 8B, the method includes:

Step 801: An RN sends an RRC connection reestablishment request (RRC connection reestablishment request) message to an eNB.

Step 802: The RN receives the RRC connection reestablishment (RRC connection reestablishment) message sent by the eNB.

Step 803: Refer to step 502 in the embodiment shown in FIG. 5A or FIG. 5B.

Step 804: The RN sends an RRC connection reestablishment complete (RRC connection reestablishment complete) message to the eNB.

The RRC connection reestablishment complete message includes an RN subframe configuration request for a CC.

CCs involved in RN subframe configuration requests for CCs included in the RRC connection reestablishment complete message may refer to all CCs used by the RN, and also may refer to changed CCs. The changed CCs include newly added CCs, remaining CCs after deletion, or CCs on a relay link that are affected by the adding and/or deleting of CCs on an access link. The RN subframe configuration request for a CC may be in bitmap mode or in subframe request list mode. For details, refer to step 503 in the embodiment shown in FIG. 5A or FIG. 5B.

According to the method provided in the embodiment, the RN may send an RN subframe configuration request for a CC to the eNB by initiating an RRC reestablishment procedure. This ensures that the eNB may configure an RN subframe.

As shown in FIG. 8A, the method provided in the embodiment may further include steps 805a and 806a.

For details about steps 805a and 806a, refer to steps 504a and 505a in the embodiment shown in FIG. 5A.

Alternatively, as shown in FIG. 8B, the embodiment may further include steps 805b and 806b.

For details about steps 805b and 806b, refer to steps 504b and 505b in the embodiment shown in FIG. 5B.

According to the method provided in the embodiment, an RN may send a subframe configuration request for a CC to an eNB through an RRC connection reestablishment procedure. After the eNB configures an RN subframe, the eNB sends the RN subframe configuration information for a CC to the RN through an RN reconfiguration procedure or an RRC connection reconfiguration procedure. This solves the problem of triggering, configuring, and sending RN subframe configuration information for a CC during RN subframe configuration for a CC. In this condition, a resource for a relay link for the RN may be configured in a CA scenario. This solves the problem that the prior art does not support RN subframe configuration when link deployment is performed on CA and RN.

Figure 9A:
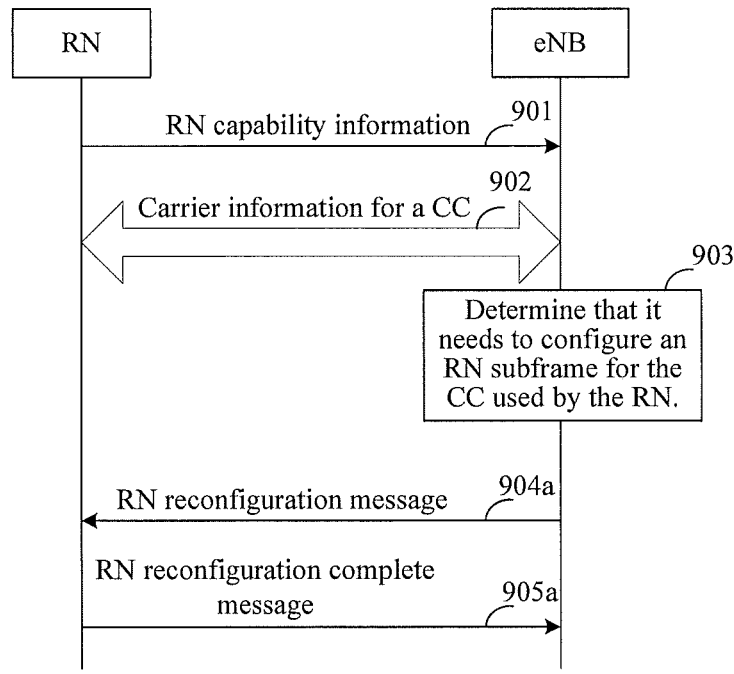
FIG. 9A and FIG. 9B are signaling flowcharts of yet another method for configuring an RN subframe according to an embodiment of the present invention.
Figure 9B:
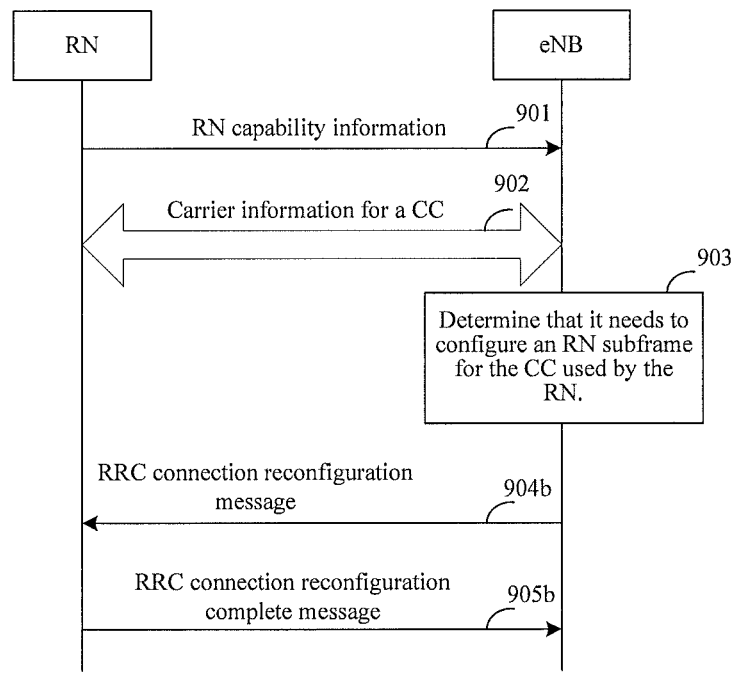

As shown in FIG. 9A or FIG. 9B, an embodiment of the present invention provides another method for configuring an RN subframe. In the embodiment, an RN reports the RN capability to an eNB and the eNB determines whether it needs to configure an RN subframe for a CC. The method includes:

Step 901: An eNB receives the RN capability information sent by an RN.

The capability information may be information such as RN antenna isolation degree, and so on.

Step 902: The eNB obtains carrier information for a carrier of an access link and carrier information for a CC of a relay link.

The eNB may obtain carrier information for a carrier of an access link from the RN through an X2 establishment procedure or an eNB configuration update (eNB configuration update) procedure.

A CC for a relay link is configured by the eNB. Therefore, the eNB may learn the carrier information for the CC of the relay link.

In the embodiment, there is no necessary sequence between step 901 and step 902. Step 902 may be performed before step 901.

Step 903: The eNB determines whether it needs to configure an RN subframe for the CC according to the RN capability information, the carrier information for a carrier of an access link, and the carrier information for a CC of a relay link.

In the embodiment, the RN capability information may be the RN antenna isolation degree. If a CC is simultaneously used on a relay link and an access link, the RN antenna isolation degree is low, and full-duplex transmission cannot be implemented on the CC, it may be determined that RN subframe configuration needs to be performed on the CC. If a CC is simultaneously used on a relay link and an access link, the RN antenna isolation degree is high enough, and full-duplex transmission may be implemented on the CC; or if the CC is only used on a relay link or an access link, it may be determined that RN subframe configuration does not need to be performed on the CC.

In the embodiment, after the eNB determines to configure an RN subframe for the CC requiring RN subframe configuration, as shown in FIG. 9A, the method may further include steps 904a and 905a.

For details about steps 904a and 905a, refer to steps 504a and 505a in the embodiment shown in FIG. 5A.

Alternatively, as shown in FIG. 9B, the embodiment may further include steps 904b and 905b.

For details about steps 904b and 905b, refer to steps 504b and 505b in the embodiment shown in FIG. 5B.

According to the method provided in the embodiment, an RN may send RN capability to an eNB. According to the RN capability and carrier information for a CC used by the RN, the eNB determines to configure an RN subframe for the CC. After the eNB configures an RN subframe, the eNB sends the RN subframe configuration information for a CC to the RN through an RN reconfiguration procedure or an RRC connection reconfiguration procedure. A base station may actively trigger configuration of a relay link resource when CA and RN are deployed in an integrated manner, without receiving a request from the RN. This solves the problem of triggering, configuring, and sending RN subframe configuration information for a CC during RN subframe configuration for a CC. In this condition, a resource for a relay link for the RN may be configured in a CA scenario. This solves the problem that the prior art does not support RN subframe configuration when link deployment is performed on CA and RN.

Figure 9C:
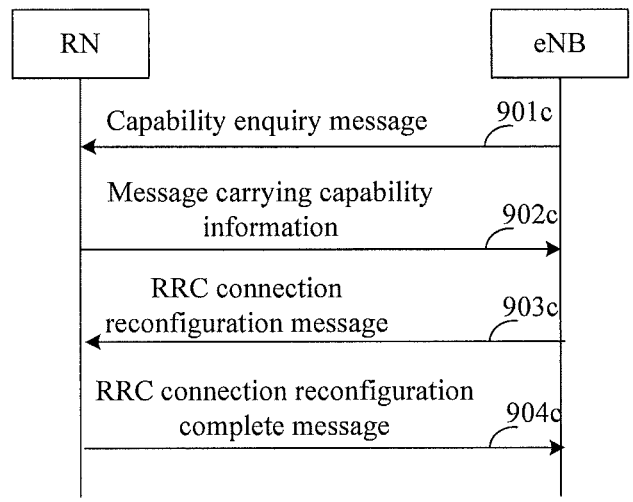
FIG. 9C is a signaling flowchart of yet another method for configuring an RN subframe according to an embodiment of the present invention.

As shown in FIG. 9C, an embodiment of the present invention provides still another method for configuring an RN subframe. In the method, an RN may determine whether it needs to configure an RN subframe for the CC if a relay link uses a carrier used by an access link as the CC of the relay link during an RN capability transfer (RN capability transfer) procedure. The method may include:

Step 901c: An RN receives a capability enquiry (capability enquiry) message sent by an eNB.

In the embodiment of the present invention, when an eNB is querying the RN capability, the eNB regards the RN as a UE. Therefore, the eNB may send a "UE capability enquiry (UE capability enquiry)" message to the RN. In the embodiment, a capability enquiry message sent to the RN by the eNB may also be an "RN capability enquiry" message.

Step 902c: The RN sends a message carrying capability information to the eNB.

If the eNB sends a "UE capability enquiry" message to the RN, the RN regards itself as a UE. The "UE capability information (UE capability information) message sent by the eNB carries the RN capability information. If the eNB sends an "RN capability enquiry" message to the RN, the RN sends an "RN capability information" message that carries the RN capability information to the eNB.

In the embodiment, the message carrying capability information sent by the RN to the eNB may contain a piece of indication information. The piece of indication information indicates that an RN subframe needs to be configured for the CC if the CC configured for a relay link is the same as a carrier for an access link.

In the embodiment, carrier information for a carrier of an access link may also be carried in the message carrying capability information. The message carrying the capability information may also not include the carrier information for a carrier of an access link. The RN may send the carrier information for a carrier of an access link to the eNB through an X2 establishment procedure or an eNB configuration update procedure.

In the embodiment, after the RN sends the message indicating an RN subframe needs to be configured for the CC if the CC configured for a relay link is the same as the carrier for an access link to the eNB through a capability interaction procedure. If the eNB needs to perform SCell configuration for the RN, and if the CC to be configured for a relay link is the same as the carrier for an access link, the RN simultaneously configures an RN subframe for the CC.

The embodiment may further include:

Step 903c: The RN receives an RRC connection reconfiguration message sent by the eNB.

In an RRC connection reconfiguration message, the RN subframe configuration information for a CC may be carried in the IE "RN subframe configuration (RN subframe configuration)". For example, the RN subframe configuration information may be carried using the IE "RN subframe configuration" in the SCell adding configuration (such as IF "SCellToAddMod-r10") in the RRC connection reconfiguration message. The M "RN subframe configuration" may also be carried in other IEs of the RRC connection reconfiguration message.

The RRC connection reconfiguration message may also include a relay link channel configuration information list (such as IE "rn channel configuration list"). The relay link channel configuration information list may contain configuration information for a relay link channel for a CC, such as configuration information for relay physical downlink control channel (relay physical downlink control channel, R-PDCCH), or relay physical downlink shared channel (relay physical downlink shared channel, R-PDSCH). For example, the configuration information for a relay link channel for a CC may be carried using the IE "relay link channel configuration information list" in the SCell adding configuration (such as M "CellToAddMod-r10") in the RRC connection reconfiguration message.

In addition, the embodiment may also include step 904c: the RN sends an RRN connection reconfiguration complete message to the eNB.

According to the method provided in the embodiment, an RN uses indication information to indicate to configure an RN subframe for a CC if the CC configured for a relay link is the same as the carrier for an access link during the RN capability information interaction procedure. In this case, an eNB may simultaneously allocate the RN subframe of the CC if the configured CC is the same as the CC for the access link during SCell configuration for the RN. This reduces signaling overhead and achieves RN subframe configuration in a CA scenario.

Figure 10:
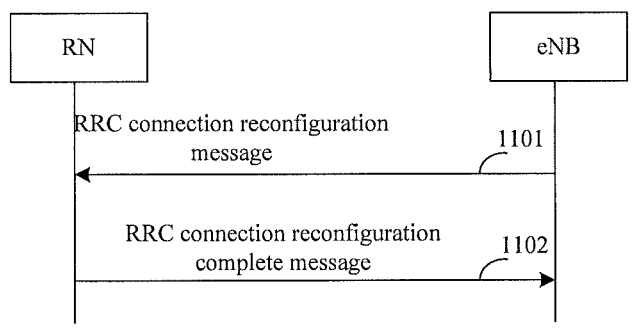
FIG. 10 is a signaling flowchart of yet another method for configuring an RN subframe according to an embodiment of the present invention.

As shown in 10, an embodiment of the present invention provides a signaling flowchart of another method for configuring an RN subframe. In the method provided in the embodiment, an eNB configures an RN subframe and then sends the configuration information to an RN. As shown in FIG. 10, the method includes:

Step 1001: An eNB sends an RN reconfiguration (RN reconfiguration) message to an RN.

The RN reconfiguration message includes the RN subframe configuration information for a CC. The eNB may obtain the RN subframe configuration information for a CC according to the OAM configuration, the resource required for a relay link of the RN, and the impact on configuration of a relay link for other RNs under the eNB. The RN subframe configuration information may be obtained by the eNB after the eNB receives an RN subframe configuration request for a CC sent by the RN, such as the RN subframe configuration request for a CC sent by the RN in the embodiments shown in FIG. 5A, FIG. 5B, FIG. 7A, FIG. 7B, FIG. 8A, and FIG. 8B. Alternatively, the RN subframe configuration information may be obtained by the eNB after the eNB obtains the carrier information for a CC used by the RN and determines the CC requiring RN subframe configuration according to the RN capability information and information about the CC used by the RN, such as the RN capability information sent by the RN to the eNB in the embodiment shown in FIG. 9A and FIG. 9B.

In the RN reconfiguration message, the IE "RN subframe configuration list (m subframe configuration list)" may be used to carry RN subframe configuration information for a secondary CC. The RN subframe configuration list also includes the RN subframe configuration information for a primary CC. For example, the RN subframe configuration list may be as follows:

```
rn-subframeconfigList ::=       SEQUENCE (SIZE (1..maxcell)) OF
rn-SubframeConfig
rn-SubframeConfig ::=   SEQUENCE {
    cell-index              ServCellIndex,
    rn-subframeconfig-rxx           rn-SubframeConfig-rxx
}
```

In the RN subframe configuration list, a cell index is used to indicate the configured CC, and the RN subframe configuration list carries the RN subframe configuration information corresponding to the CC. For the CC not requiring RN subframe configuration, the RN subframe configuration information for the CC may be excluded from the IE. Alternatively, the RN subframe configuration field for the CC not requiring RN subframe configuration may be set to all 0, which indicates that an RN subframe does not need to be configured. Certainly, if 1 indicates that an RN subframe does not need to be configured, the RN subframe configuration field for the CC not requiring RN subframe configuration may also be set to all 1.

Alternatively, the RN subframe configuration list (such as IE "SCell un subframe configuration list") for a secondary CC may be carried in an RN reconfiguration message. The RN subframe configuration list for the secondary CC includes the subframe configuration information for a relay link for the secondary CC. The format of the RN subframe configuration list for the secondary CC may be the same as that of the RN subframe configuration list. In this case, the RN subframe configuration information for the primary CC may be carried in the IE "rn-SubframeConfig-r10" of the RN reconfiguration message.

For the CC not requiring RN subframe configuration, the RN subframe configuration information for the CC may be excluded from the IE. Alternatively, the RN subframe configuration field for the CC may be set to all 0, which indicates that an RN subframe does not need to be configured. Certainly, the RN subframe configuration field for the CC may also be set to all 1, which indicates that an RN subframe does not need to be configured.

In the embodiment, the RN reconfiguration message may also include a relay link channel configuration information list (such as IE "rn channel configuration list"). The relay link channel configuration information list may contain configuration information for a relay link channel for a CC, such as configuration information for R-PDCCH or R-PDSCH.

Alternatively, the IE may also be carried in an RN reconfiguration message.

In the RN reconfiguration message, the IE "RN subframe configuration CC list (rn subframe configuration CC list)" and the IE "RN subframe configuration information (such as subframeconfig-rxx)" may be used to configure an RN subframe for a CC. "RN subframe configuration CC list" carries a cell index for a CC requiring RN subframe configuration. The RN subframe configuration information is the same for all CCs in the "RN subframe configuration CC list". The RN subframe configuration information for all the CCs is carried in the IE "RN subframe configuration information." For the CC not requiring RN subframe configuration, the RN subframe configuration information does not need to be carried in the "RN subframe configuration CC list." For example,

```
rn-subframeconfigCCList ::=   SEQUENCE (SIZE (1..maxcell)) OF
rn-SubframeConfig
rn-SubframeConfig ::=   SEQUENCE {
    cell-index              ServCellIndex,
}
rn-subframeconfig-rxx       rn-SubframeConfig-rxx
```

Step 1002: The eNB receives an RN reconfiguration complete (RN reconfiguration complete) message sent by the RN.

After the RN receives an RN reconfiguration message sent by an eNB, the RN accomplishes RN reconfiguration and may obtain the RN subframe configuration information for a CC.

According to the method provided in the embodiment, an eNB may send the RN subframe configuration information for a CC configured using an RN reconfiguration message to an RN during an RN reconfiguration procedure. This solves the problem of configuring an RN subframe for a CC and sending RN subframe configuration information for a CC in a CA scenario. In this condition, an RN subframe resource may be configured in a CA scenario. This solves the problem that the prior art does not support RN subframe configuration when link deployment is performed on CA and RN.

Figure 11:
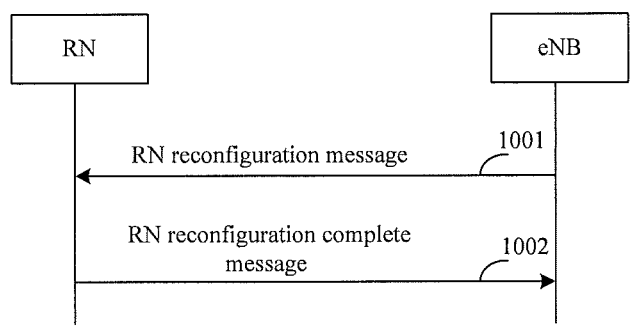
FIG. 11 is a signaling flowchart of yet another method for configuring an RN subframe according to an embodiment of the present invention.

As shown in FIG. 11, an embodiment of the present invention provides still another method for configuring an RN subframe. In the method provided in the embodiment, an eNB may configure an RN subframe for the CC and send the RN subframe configuration information for the CC to the RN using an RRC connection reconfiguration message. The method includes:

Step 1101: An eNB sends an RRC connection reconfiguration message to an RN.

The RRC connection reconfiguration message includes the RN subframe configuration information for a CC. The eNB may obtain the RN subframe configuration information for a CC according to the OAM configuration, the resource required for a relay link of the RN, and the impact on configuration of a relay link for other RNs under the eNB. The RN subframe configuration information may be obtained by the eNB after the eNB receives the RN subframe configuration request for a CC sent by the RN, such as the RN subframe configuration request for a CC sent by the RN in the embodiments shown in FIG. 5, FIG. 7, and FIG. 8. Alternatively, the RN subframe configuration information may be obtained by the eNB after the eNB obtains the carrier information for a CC used by the RN and determines the CC requiring RN subframe configuration according to the RN capability information and information about the CC used by the RN, such as the RN capability information sent by the RN to the eNB in the embodiment shown in FIG. 9.

In an RRC connection reconfiguration message, the RN subframe configuration information for a CC may be carried in the IE "RN subframe configuration (RN subframe configuration)". For example, the RN subframe configuration information may be carried using the IE "RN subframe configuration" in the SCell adding configuration (such as IE "SCellToAddMod-r10") in the RRC connection reconfiguration message. The IE "RN subframe configuration" may also be carried in other IEs of the RRC connection reconfiguration message. In the RRC connection reconfiguration message, the format of SCell adding configuration may be as follows:

```
SCellToAddMod-r10 ::=   SEQUENCE {
    sCellIndex-r10              SCellIndex-r10,
    cellIdentification          SEQUENCE {
        physCellId-r10              PhysCellId,
        dl-CarrierFreq              ARFCN-ValueEUTRA
    }                                                       OPTIONAL, -- Cond
    SCellAdd
        radioResourceConfigCommon-r10   RadioResourceConfigCommonSCell-r10  OPTIONAL, -- Cond
```

-continued

```
SCellAdd2
    radioResourceConfigDedicated-r10  RadioResourceConfigDedicatedSCell-r10  OPTIONAL, -- Cond
SCellAdd2
    rn-SubframeConfig-rxx             RN-SubframeConfig-rxx                  OPTIONAL, -- Need
ON
    ...
}
``` where, for the CC not requiring RN subframe configuration, the RN subframe configuration information for the CC may be excluded from the IE. Alternatively, the RN subframe configuration field for the CC may be set to all 0, which indicates that an RN subframe does not need to be configured. Certainly, the RN subframe configuration field for the CC may also be set to all 1, which indicates that an RN subframe does not need to be configured.

In the embodiment, the RRC connection reconfiguration message may also include a relay link channel configuration information list (such as IE "rn channel configuration list"). The relay link channel configuration information list may contain configuration information for a relay link channel for a CC, such as configuration information for R-PDCCH or R-PDSCH. For example, the configuration information for a relay link channel for a CC may be carried using the LE "relay link channel configuration information list" in the SCell adding configuration (such as IE "CellToAddMod-r10") in the RRC connection reconfiguration message. For example, the base station 140 may be a base station communicating with the RN in the foregoing method embodiments of the present invention. In the communication system 12, the relay node 130 may send an RN subframe configuration request for one or more CCs to the base station 140 and receive RN subframe configuration information for the CC sent by the base station 140. The RN subframe configuration information for the CC is obtained through configuration performed by the base station 140 after the base station 140 receives an RN subframe configuration request for the CC. The base station 140 may receive the RN subframe configuration request for one or more CCs sent by the relay node 130 and configure an RN subframe for the CC. After that, the base station 140 obtains the RN subframe configuration request information for the CC. Then, the base station 140 sends the RN subframe configuration request information to the relay node 130. For details about how the relay node 130 and the base station 140 configure an RN subframe, refer to the methods in the embodiments shown in FIG. 5, FIG. 7, and FIG. 8.

```
SCellToAddMod-r10 ::=       SEQUENCE {
    sCellIndex-r10              SCellIndex-r10,
    cellIdentification          SEQUENCE {
        physCellId-r10              PhysCellId,
        dl-CarrierFreq              ARFCN-ValueEUTRA
    }                                                              OPTIONAL, -- Cond
SCellAdd
    radioResourceConfigCommon-r10    RadioResourceConfigCommonSCell-r10   OPTIONAL, -- Cond
SCellAdd2
    radioResourceConfigDedicated-r10 RadioResourceConfigDedicatedSCell-r10 OPTIONAL, -- Cond
SCellAdd2
    rn-SubframeConfig-rxx            RN-SubframeConfig-rxx                OPTIONAL, -- Need
ON
rn-ChannelConfig-rxx             RN- ChannelConfig-rxx         OPTIONAL, -- Need ON
    ...
}
```

Step 1102: The eNB receives an RRC connection reconfiguration complete message sent by the RN.

After the RN receives an RN connection reconfiguration message sent by the eNB, it performs RN connection reconfiguration, obtains the RN subframe configuration for a CC.

According to the method provided in the embodiment, the eNB may send the RN subframe configuration information for a CC configured using an RRC connection reconfiguration message to the RN during the RRC connection reconfiguration procedure. This solves the problem of configuring an RN subframe for a CC and sending RN subframe configuration information for a CC in a CA scenario. In this condition, an RN subframe resource may be configured in a CA scenario. This solves the problem that the prior art does not support RN subframe configuration when link deployment is performed on CA and RN.

Figure 12:
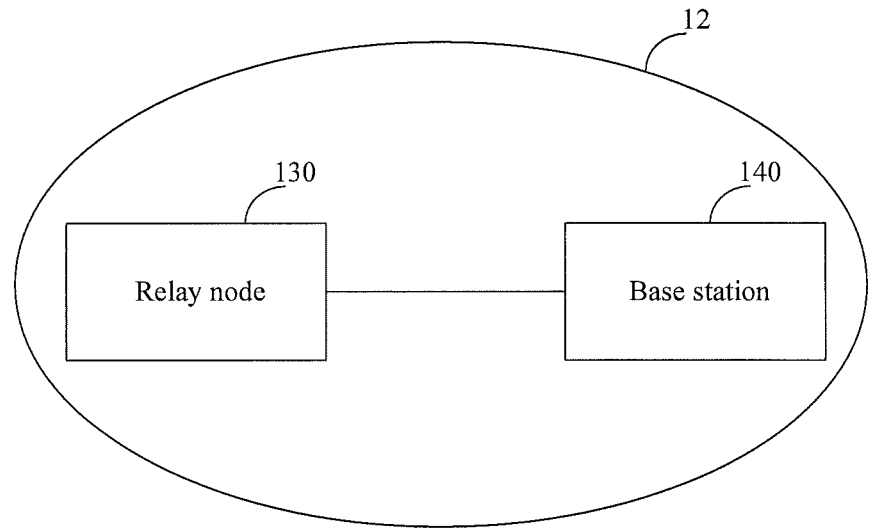
FIG. 12 is a structural schematic diagram of a communication system according to an embodiment of the present invention.
Figure 13:
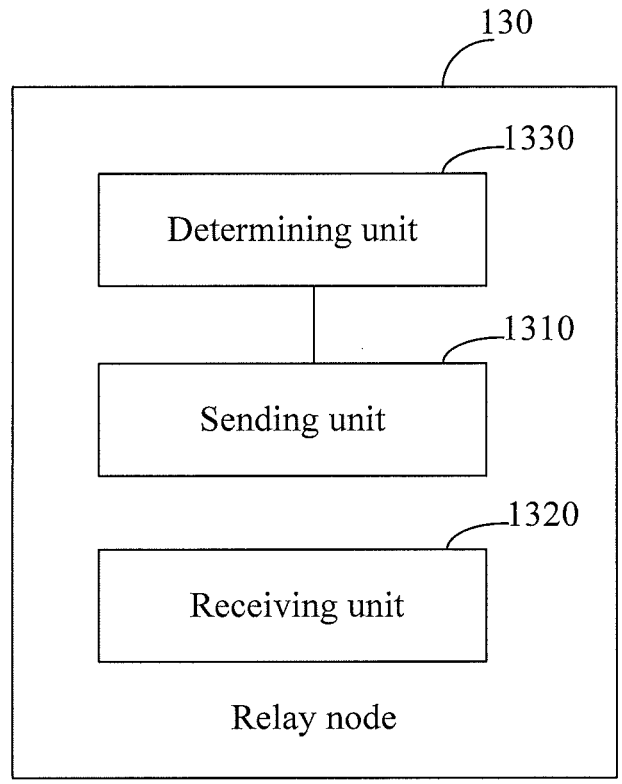
FIG. 13 is a structural schematic diagram of a relay node according to an embodiment of the present invention.

As shown in FIG. 12, an embodiment of the present invention provides a communication system 12. The communication system 12 may at least include a relay node 130 and a base station 140. The relay node 130 may be an RN in the foregoing method embodiments of the present invention and As shown in FIG. 13, an embodiment of the present invention provides a relay node 130. The relay node 130 may include a sending unit 1310, which is adapted to send an RN subframe configuration request for one or more CCs to the base station 140. The sending unit 1310 may send an RRC connection reconfiguration complete message to the base station 140. The RRC connection reconfiguration complete message includes the RN subframe configuration request for the CC. Alternatively, the sending unit 1310 may send an RRC message to the base station 140. The RRC message includes the RN subframe configuration request for the CC. Alternatively, the sending unit 1310 may send an RRC connection reestablishment complete message to the base station 140. The RRC connection reestablishment complete message includes the RN subframe configuration request for the CC. CCs involved in the RN subframe configuration request for the one or more CCs sent by the sending unit 1310 may either refer to all CCs used on a relay link of an RN or refer to changed CCs on a relay link. All CCs used on a relay link refer to all CCs on the relay link after the RRC connection reconfiguration process. The changed CCs on the relay link include newly added CCs on the relay link, remaining CCs after deletion of original CCs on the relay link, or CCs on the relay link that are affected by the adding and/or deleting of CCs on an access link. The CCs on a relay link that are affected by the adding and/or deleting of CCs on an access link refer to the CCs on a relay link that are the same as the added and/or deleted CCs on an access link. The sending unit 1310 may be in bitmap mode or in subframe request list mode. For details, refer to the foregoing method embodiments.

The relay node 130 may also include a receiving unit 1320, which is adapted to receive the RN subframe configuration information for the CC sent by the base station 140. The RN subframe configuration information for the CC is obtained through configuration performed by the base station 140 after the base station 140 receives the RN subframe configuration request for the CC. The receiving unit 1320 may receive an RN reconfiguration message from an RN. The RN reconfiguration message includes the RN subframe configuration information for the CC. Alternatively, the receiving unit 1320 may receive an RRC connection reconfiguration message sent by an RN. The RRC connection reconfiguration message includes the RN subframe configuration information for the CC.

The relay node 130 may also include a determining unit 1330, which is adapted to determine that one or more CCs require RN subframe configuration. The determining unit 1330 may be adapted to determine whether one or more CCs require RN subframe configuration according to carrier information for the CC of a relay link, carrier information for a carrier of an access link, and subframe capability information for the relay node 130. The RN subframe capability information may be an RN antenna isolation degree. After the determining unit 1330 determines that the one or more CCs require RN subframe configuration, the sending unit 1310 may send the RN subframe request for the one or more CCs to the base station 140.

Figure 14:
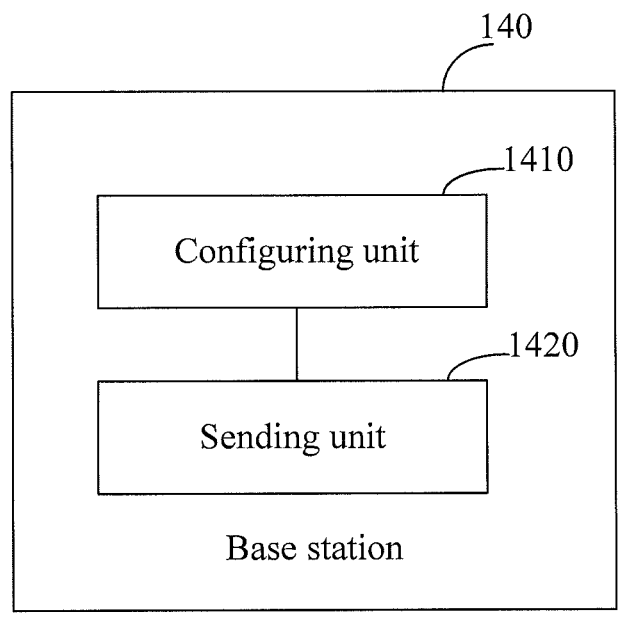
FIG. 14 is a structural schematic diagram of a base station according to an embodiment of the present invention.

As shown in FIG. 14, an embodiment of the present invention provides a base station 140. The base station 140 may include a configuring unit 1410, which is adapted to receive an RN subframe configuration request for one or more CCs sent by the relay node 130 and configure an RN subframe for the CC. The base station 140 may also include a sending unit 1420, which is adapted to send RN subframe configuration information for the CC configured by the configuring unit 1410 to the relay node 130.

Figure 15:
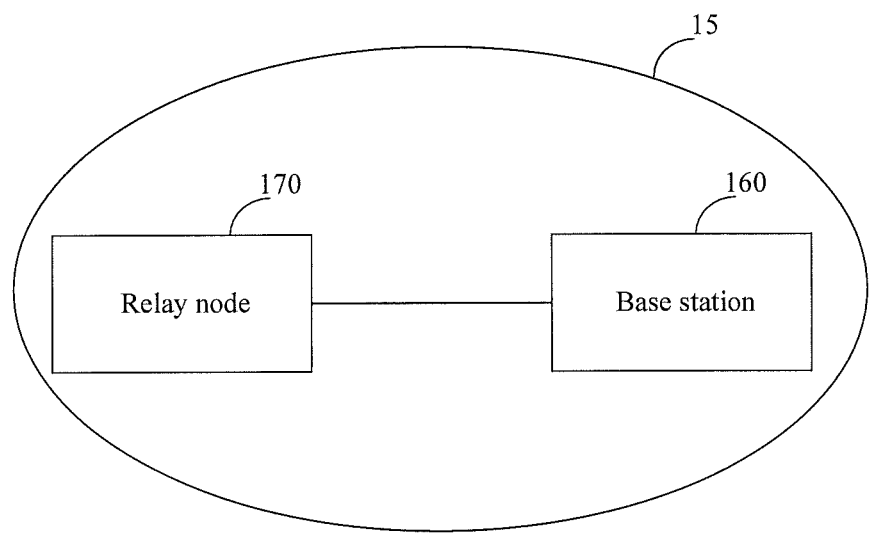
FIG. 15 is a structural schematic diagram of a communication system according to an embodiment of the present invention.

As shown in FIG. 15, an embodiment of the present invention provides another communication system 15. The communication system 15 may include a base station 160 and a relay node 170. The base station 160 is adapted to receive RN capability information sent by the relay node 170 and obtain carrier information for a carrier of an access link and carrier information for a CC of a relay link. According to the RN capability information, the carrier information for a carrier of an access link, and the carrier information for a CC of a relay link, the base station 160 determines whether the CC requires RN subframe configuration. The relay node 170 may be adapted to send the RN capability information to the base station 160. For details about the method for communication between the relay node 170 and the base station 160, refer to the method embodiment shown in FIG. 9.

Figure 16:
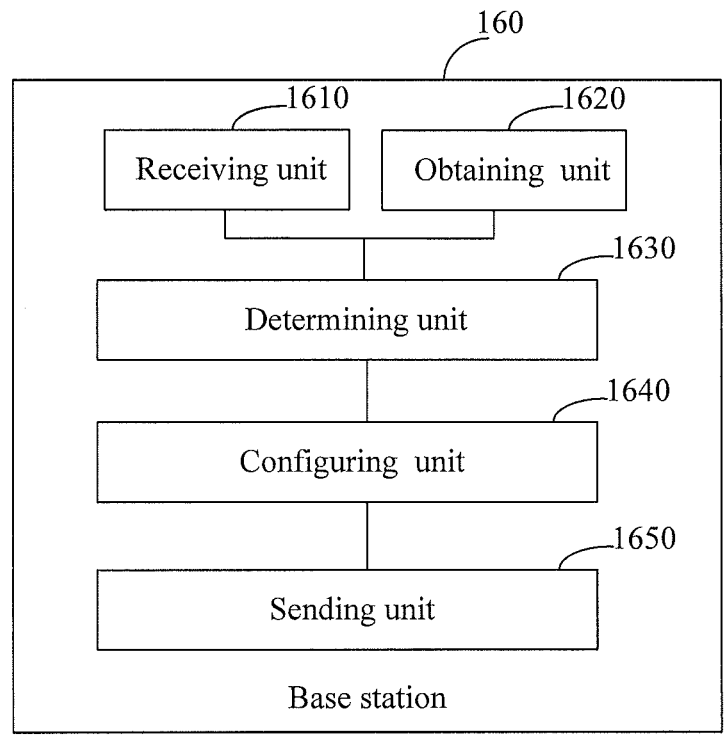
FIG. 16 is a structural schematic diagram of a base station according to an embodiment of the present invention.
Figure 17:
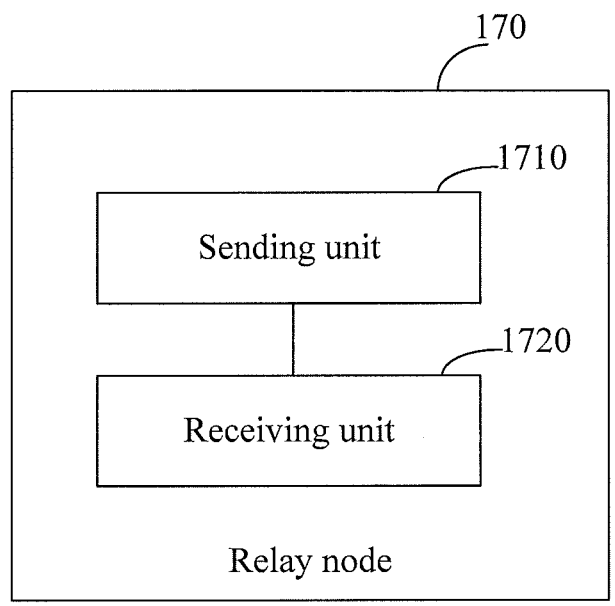
FIG. 17 is a structural schematic diagram of a relay node according to an embodiment of the present invention.

As shown in FIG. 16, the base station 160 may include a receiving unit 1610, which is adapted to receive RN capability information sent by the relay node 170. The base station 160 may also include an obtaining unit 1620, which is adapted to obtain carrier information for a carrier of an access link and carrier information for a CC of a relay link. The base station 160 may also include a determining unit 1630, which is adapted to determine whether the CC requires RN subframe configuration according to the RN capability information, the carrier information for a carrier of an access link, and the carrier information for a CC of a relay link.

Furthermore, the base station 160 may also include a configuring unit 1640, which is adapted to configure an RN subframe for the CC and obtain RN subframe configuration information for the CC. The base station 160 may also include a sending unit 1650, which is adapted to send the RN subframe configuration information for the CC configured by the configuring unit 1640 to the relay node 170.

The relay node 170 may include a sending unit 1710, which is adapted to send the RN capability information to the base station 160. The relay node 170 may also include a receiving unit 1720, which is adapted to receive the RN subframe configuration for the CC sent by the base station 160.

Figure 18:
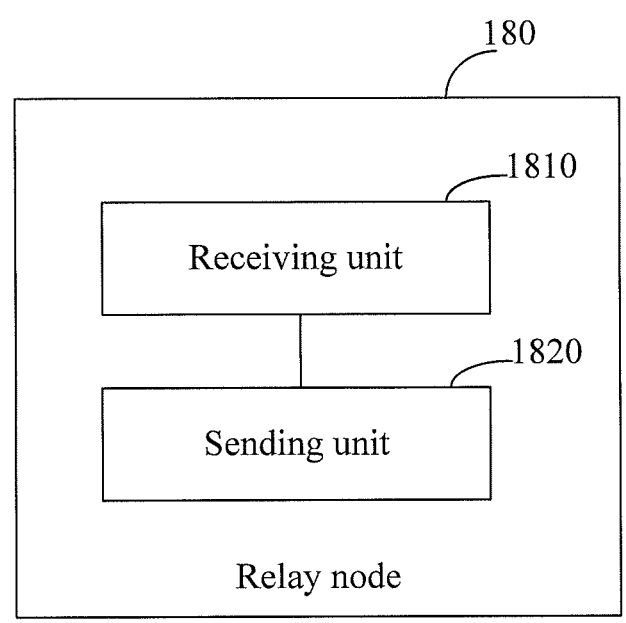
FIG. 18 is a structural schematic diagram of a relay node according to an embodiment of the present invention.

As shown in FIG. 18, the embodiment of the present invention also provides a relay node 180, which may implement the method embodiment shown in FIG. 9C. The relay node 180 includes a receiving unit 1810, which is adapted to receive a capability enquiry message sent by the base station.

The RN 180 also includes a sending unit 1820, which is adapted to send a message carrying capability information to the base station. The message carrying the capability information includes indication information. The indication information is used to indicate that an RN subframe needs to be configured for the CC if the CC configured for a relay link is the same as the carrier for an access link.

The message carrying the capability information may also include carrier information for a carrier of an access link.

According to the communication system, the relay node, and the base station provided in the embodiments of the present invention, the problem of triggering, configuring, and sending RN subframe configuration information for a CC during RN subframe configuration for a CC may be solved when CA and RN are deployed in an integrated manner. In this condition, a resource for a relay link for the RN may be configured in a CA scenario. This solves the problem that the prior art does not support RN subframe configuration when link deployment is performed on CA and RN.

A person skilled in the art may understand that the information in the embodiments of the present invention may be indicated by any technology, such as data (data), instructions (instructions), command (command), information (information), signal, (signal), bit (bit), symbol (symbol), and chip (chip) and may be transmitted through voltage, current, electromagnetic wave, magnetic field or magnetic particles (magnetic particles), optical field or optical particles (optical particles), or combination of any of the items.

A person skilled in the art may also understand that various illustrative logical block (illustrative logical block) units and steps illustrated in embodiments of the present invention may be implemented using electronic hardware, computer software, or both. To clearly display interchangeability (interchangeability) between hardware and software, the illustrative components (illustrative components), units, and steps have universally described their functions. Whether the functions are implemented by hardware or software depends on the specified application and the design requirements of the entire system. A person skilled in the art may use various methods to implement the functions for each specified application, but such implementation should not be considered as going beyond the protection scope of the present invention.

The various illustrative logical blocks or units described in embodiments of the present invention may implement or operate the functions using a general processor, a digital signal processor, an application specific integrated circuit (ASIC), a field programmable gate array (FPGA) or other programmable logic apparatus, discrete gate or transistor logic, discrete hardware components, or any other designed combination. The general processor may be a microprocessor. As an alternative, the processor may also be any conventional processor, controller, microcontroller or state machine. A processor may also be achieved through the combination of computing apparatus, such as combination of a digital signal processor and a microprocessor, a plurality of microprocessors, one or more microprocessors and one digital signal processor core, or any other similar configurations.

The steps of the methods or algorithms described in the embodiments provided in the present invention may be implemented by using hardware, a software module executed by a processor, or a combination of them. A software module may be stored in a Random Access Memory (RAM), a flash memory, a Read Only Memory (ROM), an Electrically Programmable ROM (EPROM), an Electrically Erasable Programmable ROM (EEPROM), a register, a hard disk, a removable disk, a CD-ROM, or any other storage media in the art. Exemplarily, storage media may be connected to a processor so that the processor may read information from the storage media and may save the information in the storage media. Alternatively, the storage media may also be integrated into a processor. The processor and the storage media may be configured in an ASIC. The ASIC may be configured in a user terminal. As an alternative, the processor and the storage media may also be configured in different components in the user terminal.

In one or more exemplary designs, the functions described in the embodiments of the present invention may be achieved using hardware, software, firmware, or any combination of the three. If implemented using software, these functions may be stored in computer readable media, or may be transferred to computer readable media in the format of one or more instructions or codes. A computer readable media includes computer storage media and communications media that facilities transferring of a computer program from one place to the other places. Storage media may be free media that may be accessed and visited by any general or special computer. For example, such computer readable media may include, but not limited to, RAM, ROM, EEPROM, CD-ROM or other compact disk storage, magnetic disk storage, or magnetic storage apparatus, or any other media that may carry or store data in the format of instructions, data structure, and program code that may be read by a special computer, or a general or special processor. In addition, any connection may be suitably defined as a computer readable medium. For example, if software is transmitted using a coaxial cable, an optical computer, a twisted pair, a digital subscriber line, or using infrared, radio, and microwave modes from a website, a server, or other remote resources, the software is contained in the defined computer readable media. The disk (disk) and disc (disc) include a compressed disk, a compact disk, a CD-ROM, a DVD, a floppy disk, and a Blu-ray disc. A disc usually copies the data in magnetic mode, but a disk usually copies data using laser in optical mode. The combinations may also be included in computer readable media.

The description in the present invention may ensure that any contents that may use or implement technologies in the present invention, and any modification according to the disclosed contents are considered as apparent in the art. The basic principles described in the present invention may be applied to other deformation without departing from the essence and scope of the present invention. Therefore, the contents disclosed in the present invention are not only limited to the described embodiments and design, but may be also extended to the maximum scope that is consistent with the principles of the present invention and disclosed new features.

What is claimed is:

1. A method for configuring a relay node subframe, comprising:
   sending, by a relay node (RN), an RN subframe configuration request for at least one component carrier (CC) to a base station, wherein RN subframe configuration for the at least one CC is implemented responsive to the RN subframe configuration request; and
   receiving, by the RN, RN subframe configuration information for the RN subframe configuration for the at least one CC sent by the base station, wherein the RN subframe configuration information for the at least one CC is obtained through configuration performed by the base station after the base station receives the RN subframe configuration request for the at least one CC,
   wherein the sending of the RN subframe configuration request by the RN comprises:
      sending, by the RN, a radio resource control (RRC) connection reconfiguration complete message to the base station, wherein the RRC connection reconfiguration complete message comprises the RN subframe configuration request for the at least one CC; or
      sending, by the RN, an RRC message to the base station after completing RRC connection reconfiguration, wherein the RRC message comprises the RN subframe configuration request for the at least one CC; or
      sending, by the RN, an RRC connection reestablishment complete message to the base station, wherein the RRC connection reestablishment complete message comprises the RN subframe configuration request for the at least one CC.

2. The method according to claim 1, wherein the RRC connection reconfiguration complete message or the RRC connection reestablishment complete message indicates the RN subframe configuration request for the at least one CC in a bitmap mode of n bits, the n bits correspond to RN subframe configuration requests for n CCs, and n is greater than or equal to 1; or
   the RRC connection reconfiguration complete message or the RRC connection reestablishment complete message indicates the RN subframe configuration request for the at least one CC in subframe request list mode.

3. The method according to claim 1, wherein the receiving, by the RN, the RN subframe configuration information for the at least one CC sent by the base station comprises:
   receiving, by the RN, an RN reconfiguration message sent by the base station, wherein the RN reconfiguration message comprises the RN subframe configuration information for the at least one CC; or
   receiving, by the RN, an RRC connection reconfiguration message sent by the base station, wherein the RRC connection reconfiguration message comprises the RN subframe configuration information for the at least one CC.

4. The method according to claim 3, wherein
   when the RN reconfiguration message comprises the RN subframe configuration information for the at least one CC:
      the RN reconfiguration message comprises an RN subframe configuration list, and the RN subframe configuration list is used to indicate RN subframe configuration information for a primary CC and/or RN subframe configuration information for a secondary CC; or the RN reconfiguration message comprises an RN subframe configuration list for a secondary CC, and the RN subframe configuration list for the secondary CC is used to indicate RN subframe configuration information for the secondary CC; or the RN reconfiguration message comprises an RN subframe configuration CC list and RN subframe configuration information, and the RN subframe configuration CC list is used to indicate a CC requiring RN subframe configuration and RN subframe configuration information for the CC indicated in the RN subframe configuration CC list is the RN subframe configuration information; or when the RRC connection reconfiguration message comprises the RN subframe configuration information for the at least one CC:

the RRC connection reconfiguration message comprises an RN subframe configuration list, wherein the RN subframe configuration list is used to indicate the RN subframe configuration information for the at least one CC.

5. The method according to claim 4, wherein the RN reconfiguration message or the RRC connection reconfiguration message also comprises a relay link channel configuration information list, and the relay link channel configuration information list is used to indicate the relay link channel configuration information for the at least one CC.

6. The method according to claim 1, wherein the at least one CC comprises a secondary CC or the at least one CC comprises a primary CC and a secondary CC.

7. A relay node, comprising:
a transmitter, configured to send an RN subframe configuration request for at least one component carrier (CC) to a base station; and
a receiver, configured to receive RN subframe configuration information for the at least one CC sent by the base station, wherein RN subframe configuration for the at least one CC is implemented responsive to the RN subframe configuration request and the RN subframe configuration information for the at least one CC is obtained through configuration performed by the base station after the base station receives the RN subframe configuration request for the at least one CC,
wherein sending the RN subframe configuration request by the RN comprises:
sending, by the RN, a radio resource control (RRC) connection reconfiguration complete message to the base station, wherein the RRC connection reconfiguration complete message comprises the RN subframe configuration request for the at least one CC; or
sending, by the RN, an RRC message to the base station after completing RRC connection reconfiguration, wherein the RRC message comprises the RN subframe configuration request for the at least one CC; or
sending, by the RN, an RRC connection reestablishment complete message to the base station, wherein the RRC connection reestablishment complete message comprises the RN subframe configuration request for the at least one CC.

8. The relay node according to claim 7, wherein the relay node also comprises:
a processor, configured to determine that the at least one CC requires the RN subframe configuration; and
the transmitter is further configured to send the RN subframe configuration request for the at least one CC to the base station after the processor determines that the at least one CC requires the RN subframe configuration.

9. A method for configuring a relay node subframe, comprising:
configuring, by a base station, a relay node (RN) subframe for at least one component carrier CC responsive to one of an RN subframe configuration request for the at least one CC and a determination made by the base station for configuring an RN subframe for the at least one CC, wherein RN subframe configuration for the at least one CC is implemented responsive to the RN subframe configuration request; and
sending, by the base station, the RN subframe configuration information for the at least one CC to the RN,
wherein the sending of the RN subframe configuration request by the RN comprises:
sending, by the RN, a radio resource control (RRC) connection reconfiguration complete message to the base station, wherein the RRC connection reconfiguration complete message comprises the RN subframe configuration request for the at least one CC; or
sending, by the RN, an RRC message to the base station after completing RRC connection reconfiguration, wherein the RRC message comprises the RN subframe configuration request for the at least one CC; or
sending, by the RN, an RRC connection reestablishment complete message to the base station, wherein the RRC connection reestablishment complete message comprises the RN subframe configuration request for the at least one CC.

10. The method according to claim 9, wherein the determination made by the base station for configuring an RN subframe for the at least one CC is obtained by the base station according to capability information for the RN, carrier information for a carrier of an access link and carrier information for a CC of a relay link, wherein the carrier information for the carrier of the access link and the carrier information for the CC of the relay link are obtained by the base station.

11. The method according to claim 10, wherein the sending, by the base station, the RN subframe configuration information for the at least one CC to an RN comprises:
sending, by the base station, an RN reconfiguration message to the RN, wherein the RN reconfiguration message comprises the RN subframe configuration information for the at least one CC; or
sending, by the base station, an RRC connection reconfiguration message to the RN, wherein the RRC connection reconfiguration message comprises the RN subframe configuration information for the at least one CC.

12. The method according to claim 9, wherein the RN subframe configuration request for the at least one CC is sent by the RN through a radio resource control (RRC) connection reconfiguration complete message; or
the RN subframe configuration request for the at least one CC is sent by the RN through an RRC message after completing RRC connection reconfiguration; or
the RN subframe configuration request for the at least one CC is sent by the RN through an RRC connection reestablishment complete message.

13. The method according to claim 12, wherein the sending, by the base station, the RN subframe configuration information for the at least one CC to an RN comprises:
sending, by the base station, an RN reconfiguration message to the RN, wherein the RN reconfiguration message comprises the RN subframe configuration information for the at least one CC; or
sending, by the base station, an RRC connection reconfiguration message to the RN, wherein the RRC connection reconfiguration message comprises the RN subframe configuration information for the at least one CC.

14. The method according to claim 9, wherein the sending, by the base station, the RN subframe configuration information for the at least one CC to an RN comprises:
sending, by the base station, an RN reconfiguration message to the RN, wherein the RN reconfiguration message comprises the RN subframe configuration information for the at least one CC; or
sending, by the base station, an RRC connection reconfiguration message to the RN, wherein the RRC connection reconfiguration message comprises the RN subframe configuration information for the at least one CC.

* * * * *

UNITED STATES PATENT AND TRADEMARK OFFICE
CERTIFICATE OF CORRECTION

PATENT NO. : 9,204,442 B2
APPLICATION NO. : 13/939341
DATED : December 1, 2015
INVENTOR(S) : Ningjuan Chang et al.

It is certified that error appears in the above-identified patent and that said Letters Patent is hereby corrected as shown below:

ON THE TITLE PAGE

Second Page, Second Column, OTHER PUBLICATIONS, Line 1

Delete "Itri" and insert --ITRI--, therefor.

Signed and Sealed this
Ninth Day of February, 2016

Michelle K. Lee
*Director of the United States Patent and Trademark Office*